United States Patent
Haster

(10) Patent No.: US 6,343,118 B1
(45) Date of Patent: Jan. 29, 2002

(54) DEVICE AND METHOD TO ESTABLISH COMMUNICATION

(75) Inventor: Lars-Olof Haster, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/161,615

(22) Filed: Sep. 28, 1998

Related U.S. Application Data

(63) Continuation of application No. PCT/SE97/00518, filed on Mar. 25, 1997.

(30) Foreign Application Priority Data

Mar. 29, 1996 (SE) .............................................. 9601228

(51) Int. Cl.⁷ ........................................... H04M 11/00
(52) U.S. Cl. ................................. 379/93.06; 370/524
(58) Field of Search ........................... 379/93.06, 93.05, 379/93.09; 370/356, 463, 357, 524

(56) References Cited

U.S. PATENT DOCUMENTS

| | | | |
|---|---|---|---|
| 4,761,779 A | | 8/1988 | Nara et al. |
| 4,922,484 A | | 5/1990 | Yoshida et al. |
| 5,305,312 A | | 4/1994 | Fornek et al. |
| 5,426,692 A | | 6/1995 | Fujise |
| 5,708,663 A | * | 1/1998 | Wright et al. ................ 370/524 |
| 6,047,006 A | * | 4/2000 | Brakefield et al. ........ 379/93.09 |

* cited by examiner

*Primary Examiner*—Stella Woo
(74) *Attorney, Agent, or Firm*—Burns, Doane, Swecker & Mathis, L.L.P.

(57) ABSTRACT

The invention relates to a method and an apparatus to establish both telephone and digital communication through an interface between a subscriber unit and a Local Exchange on a telecommunication line intended for digital traffic, for instance an ISDN-line. For the telephone communication, the subscriber unit and the Local Exchange are communicating by transmitting packages according to a protocol comprising PSTN speech communication together with at least service functions through an interface between the subscriber unit and the Local Exchange.

14 Claims, 2 Drawing Sheets

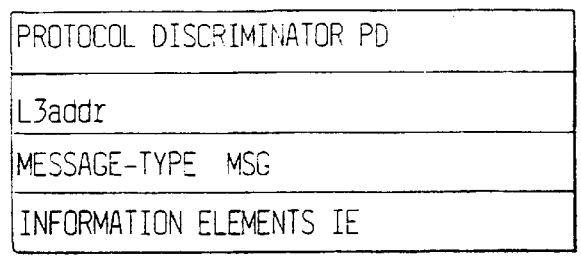
FIG. 1
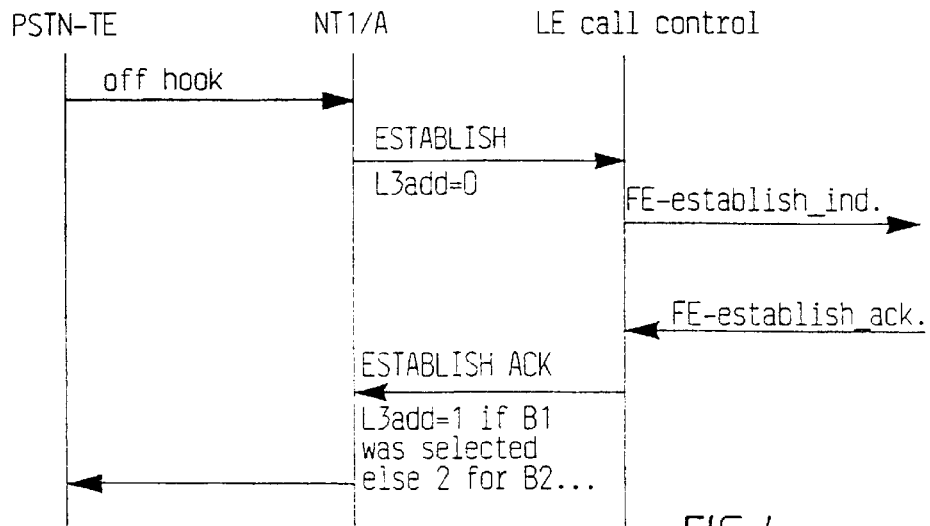
FIG. 4 ORIGINATING CALL INITIATE
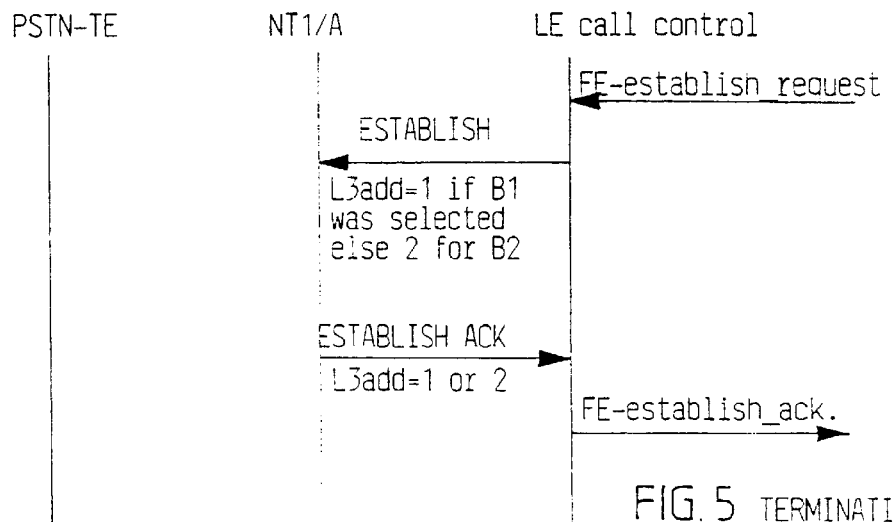
FIG. 5 TERMINATING CALL INITIATE

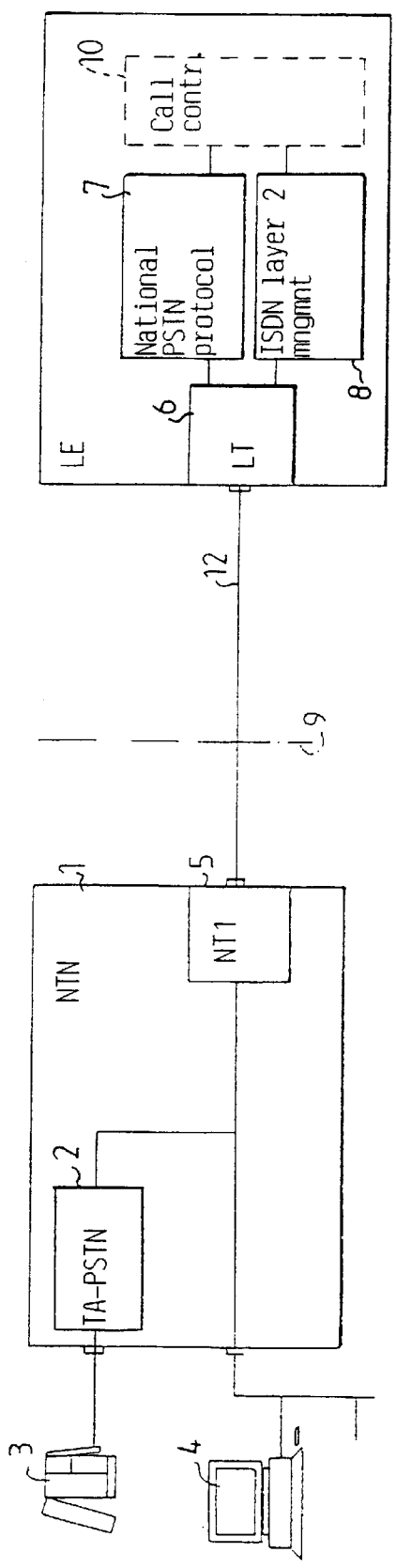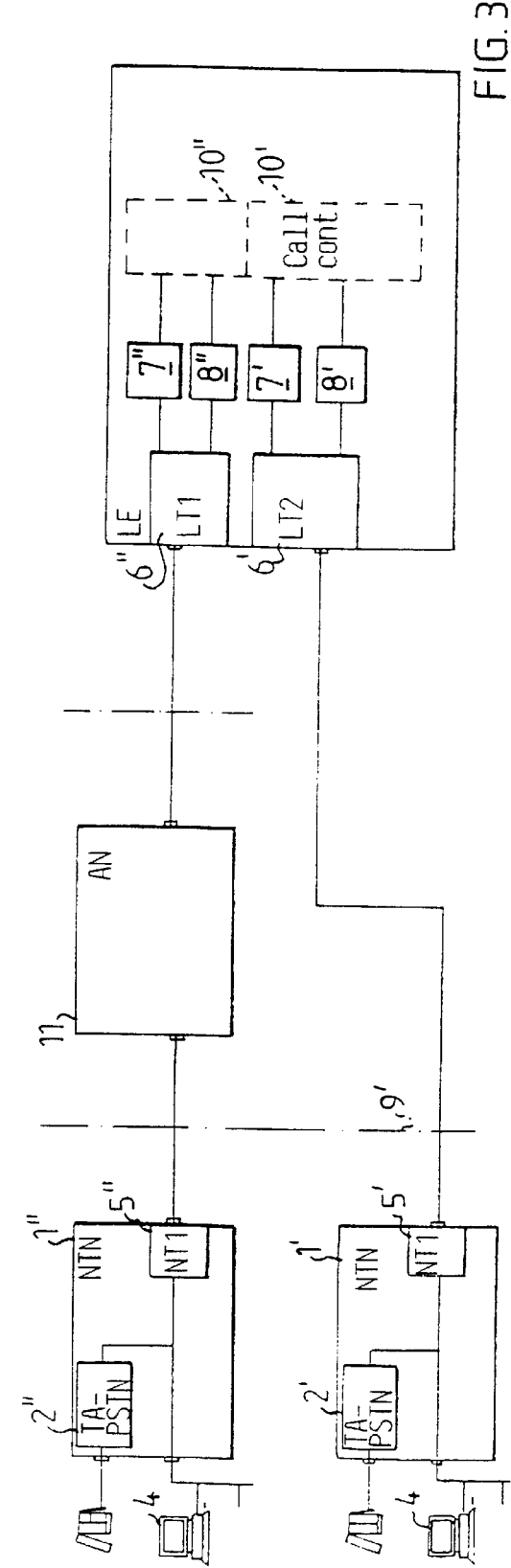

DEVICE AND METHOD TO ESTABLISH COMMUNICATION

This application is a continuation of International Application No. PCT/SE97/00518, which was filed on Mar. 25, 1997, which designated the United States, and which is expressly incorporated here by reference.

This invention relates to a device and method to establish communication through an interface between a subscriber unit and a Local Exchange on a telecommunication line intended for digital traffic, for instance an ISDN access.

BACKGROUND

In general, telephones are connected via an analogue telephone line for speech transmission through PSTN (PSTN=Public Switched Telephone Network) to a local exchange (LE). To enable transmission of digital data, e.g. from a personal computer, a modem, which converts digital data to analogue signals, is inserted between the computer and the telephone line. If subscribers want to connect to for instance INTERNET, the LE must have one modem per subscriber call, for connection to ISDN (Integrated Services Digital Network). The use of modems also makes digital transmissions rather slow, about 28 kbit/s, and this is a drawback, particularly since the use of computers and terminals in households and companies has been increased and thus also the need for digital transmissions with higher bit rate.

Thus, it has become more interesting to use the ISDN access for the subscriber PSTN service even for household telecommunication traffic, since then digital communication rate for digital communication could be increased, to about 128 kbit/s, in relation to digital communication on analogue telecomunication lines.

A possibility used for transmission of digital data as well as speech across the telephone network, is ISDN-BA (Integrated Services Digital Network—Basic Access). The transmission could then go directly from a subscriber station to an LE. In the prior art the subscriber has been provided with a Network Termination (NT) terminating the transmission towards the LE. Terminal Equipment TE, such as computers or other kinds of terminal equipment, are connected directly to the NT, while telephones are connected via an A/D- and D/A-converter equipment (TA) for speech transmission to and from the NT.

Since the NT analogue/digital and digital/analogue convert the speech transmission from and to the telephone set in order to adapt it to be transmitted across the ISDN line between the NT and the LE, problems arise regarding particular features which can be used in transmission via the PSTN. Thus, PSTN signalling from the analogue interface was mapped to ISDN across the standard ISDN-BA. By doing this mapping the call from PSTN will be recognized in the LE as ISDN. This results in limitations of services for the existing PSTN. For example, it is not possible to subscribe to services like Calling Line Identity (CLI) or the like.

Another drawback with the prior use of ISDN-BA for telephone communications is the need for two additional units at the subscriber station, the NT and the TA.

An interface to an ISDN-line for analogue telephones and computers is described in U.S. Pat. No. 5,305,312. A processor having a stored program controls access to the ISDN-line for the analogue and digital interface circuits. The telephones with their analogue interface and the computers with their digital interface are connected in parallel to an ISDN bus. The processor provides access to switch-controlled ISDN features for the analogue telephones, such as call waiting etc, i.e. the selfevident call control information features which always have to be there. However, more sophisticated, modern services, such as CLI, are not supported by the device and method described in the U.S. Pat. No. 5,305,312, and this depends upon that only a mapping is provided in the subscriber station for transferring the analogue signalling of the telephone set to be adapted for ISDN signalling, just as in the prior art using the TA equipment described above.

SUMMARY

It is an object of the present invention to provide a method and a device for enabling a subscriber to keep the same services for speech transmissions as can be provided for PSTN when upgrading from PSTN to ISDN-BA.

Another object of the invention is to provide a method and a device having the need for only one additional unit at the subscriber station.

Still another object of the invention is to provide a method and a device in which the B-channels between the subscriber station and the network to which it is connected could be chosen arbitrary and not dependent upon if the transmission is a speech or a data transmission.

These objects are achieved by a method having the features in claim 1, and a device for performing the method is disclosed in claim 6. Further features and improvements of the invention, are disclosed in the dependent claims.

The invention provides a method and an equipment to establish communication through an interface between a subscriber unit and a Local Exchange on a telecommunication line intended for digital traffic, for instance an ISDN-line. Packages are transmitted according to a protocol comprising PSTN speech communication together with at least service functions for telephone communication between the subscriber unit and the Local Exchange. An amended protocol could be used for this protocol of a kind ordinarily making PSTN speech communication through an inter-Face between an Access Network and a Local Exchange. A part, e.g. an address field, of the protocol could allocate a B-channel for communication to a particular call arbitrary at a call set-up. The protocol could support communication between an access connected to a telephone set in the subscriber unit and a call control in the Local Exchange. Preference procedure operations for allocating available B-channels to subscriber calls could be written into the protocol. The protocol could support digital IP-packets to be sent down on all available B-channels on demand. The protocol could also disconnect an occupied B-channel for a new call if more than one B-channel is occupied by the same traffic service or if the new call has a higher priority than the call occupying the B-channel.

The European Telecommunications Standard Institute (ETSI) has produced standards of type V, for instance the V5.1 interface (ETS 300 324-1), as an interface between two systems, an Access Network (AN) and a Local Exchange (LE), with flexible (provisioned) information B-channel (bearer channel) allocation. Supported access types in the V5 interface standard are ISDN-BA and PSTN services. ISDN-BA are provided for digital communication and PSTN for speech communication.

However, the standard does not yet comprise a mixture of PSTN and ISDN-BA across the same access digital section, for instance ISDN-BA, and this is of interest for the present invention. A part of this standard interface, i.e. ETS 300

324-1:1994, clause 13, with some amendments can be used as a protocol between a subscriber station and a LE. Thus the invention provides a method and a device in which the PSTN signalling priciples of the V5.1 interface standard (ETS 300 324-1, particularly clause 13) can be amended for use even for other kinds of communications than between an AN and a LE, and in particular to mix PSTN and ISDN-BA traffic on the same traffic line.

PSTN is unique in every country in Europe, and also in other countries. The V5.1 standard has defined the protocol stated above to transfer analogue line signalling between a PSTN terminal and the LE traffic handling functions (call control).

However, the standard does not describe how to choose B-channels for PSTN, since it has not earlier been possible to choose them, i.e. PSTN has always had a fixed allocated 64 kbit/s B-channel. If there are two B-channels in a mixed line for PSTN and ISDN-BA across the same access, both B-channels were owned by the ISDN-BA traffic.

The invention provides a way to overcome this drawback by providing a particular protocol in a network termination unit, also called NTN, in the subscriber station and also in the LE regarding the particular subscriber station which protocol for the PSTN traffic transmits packages between these devices comprising PSTN speech communication together with wanted service functions across the ISDN-BA line. The protocol could also let the LE allocate a B-channel arbitrary among the B-channels in the traffic line between the two devices.

Thus, the protocol comprises features to communicate across the D-channel from the LE to the subscriber equipment the B-channel which is choosen for an actual traffic PSTN communication. The programming for providing this is obvious for a person skilled in the art and is therefore not described here.

It is convenient to use an existing standard as far as possible and thus to make use the mechanisms already defined there. Since only one subscriber telephone set, or a very limited number of subscriber telephone sets, is connected to the network termination unit at the subscriber station the L3addr in the V5.1 protocol mentioned above will be useless for its intended purpose of controling traffic to different logical user ports in an Access Network. Thus the L3addr could be used for other purposes.

However, it is also within the scope of the invention to use another kind of protocol providing the same service and service functions disclosed above between the LE and the subscriber station and also to make use of and make some amendments on other standard protocols as well, such as the BCC protocol defined in V5.2 (ETS 300 347-1, clause 17).

According to an aspect of the invention this part of the standard protocol is used for a subscriber wanting to have a limited number of B-channels and thus more bandwidth for different services. This part of the protocol is then used for allocating an arbitrary B-channel for whichever service to be provided at the moment being and to communicate the kind of service and service functions and the B-channel in question across the D-channel. This part of the protocol could also be provided with priority and preferance features in order to allocate one or more B-channels to particular data services in dependence of the momentary level of traffic on the B-channels. An advantage of using an already existing protocol is that relevant parts of it could be reused for writing wanted specifications for the client. However, the protocol mentioned above in V5.1 is the preferred one, since it demands a reasonable computer utility, and thus represents the cheapest way for the inventive application.

Sometimes an AN could be coupled between the subscriber station and the LE. This AN will then be transparent for the signalling procedures between the LE and the subscriber station.

The advantage with the invention is that both rapid digital communication and speech communication keeping the same services as before when upgrading from PSTN to ISDN-BA could be provided. Also, communication with common information networks, such as INTERNET, could be done at a high rate.

The invention will provide a customer station with both an ISDN basic access User Network interface with access to the ISDN services and a PSTN interface with full access to the PSTN services.

BRIEF DESCRIPTION OF THE DRAWINGS

For a more complete understanding of the present invention and for further objects and advantages thereof, reference is now made to the following description taken in conjunction with the accompanying drawings, in which:

FIG. 1 illustrates the protocol to be used;

FIG. 2 illustrates schematically a block diagram of a first embodiment of the invention;

FIG. 3 illustrates schematically a block diagram of a second embodiment of the invention;

FIG. 4 is a sequence diagram illustrating originating call initiate; and

FIG. 5 is a sequence diagram illustrating terminating call initiate.

DETAILED DESCRIPTION

Turning to FIG. 1, the V5 PSTN protocol in accordance with the standard ETS 300 324-1:1994, clause 13, comprises a protocol discriminator PD, an L3addr denoting addresses withing layer 3 messages for PSTN to interfaces to networks and users, the type of message MSG sent, and information elements IE in the message.

The invention is related to the principle how PSTN service can address the B-channels in ISDN-BA at call set-up. The PSTN protocol from the V5.1 clause 13 shown in FIG. 1 is practical to be used.

According to an aspect of the invention the principles from the above mentioned V5.1 interface standard (or some other kind of interface protocols giving the possibility to provide extra information on a D-channel at call set-up) and the PSTN signalling are used for transmissions between an LE directly to a subscriber station. In the V5.1 interface standard the protocol mentioned above is defined for PSTN with the purpose to be a tool box for transporting the analogue line signalling through the V5 interface to the traffic control functions in the LE. This means that the LE is service responsible and controls the tunes sent and received.

In the protocol used in such a case the L3addr will be overdimensioned because it is dimensioned to store a large amount of addresses for the connections between an AN and a LE serving many subscriber stations. The L3addr could therefore be used for other purposes. Thus, according to an aspect of the invention the same address field is used to address the B-channels in the ISDN-BA interface.

Ordinarily, when this protocol is provided between an AN and a LE, the individual B-channels are allocated to individual subscribers and subscriber signalling through PSTN or ISDN.

As shown in FIG. 2, the subscriber is provided with a Network Termination Unit 1, also called NTN, common for all its telecommunication service functions. The unit 1 provides an access type making it possible for the user/subscriber to keep the same services as before when the user upgrades from PSTN to ISDN-BA. This is possible by using the principle from the V5.1 interface standard (ETS 300 324-1, clause 13) and the PSTN signalling. For instance, the national PSTN mapping according to ETR 150 (disclosed in ETS 300 324-1:1994 Annex Q, Bibliography) could be used. The protocol in FIG. 1 in the V5.1 interface standard is a protocol defined for PSTN signalling with the purpose to be a tool box for transporting the analogue line signalling across the V-interface to the traffic control functions 10 in the LE. This means that the LE is service responsible and controls the tones sent and received.

Telephones, computers, data terminal equipments can be directly connected to the unit 1 comprising a processor, memory and interfaces to the devices connected to it. The unit 1 comprises at least one analogue interface to a logic TA-PSTN 2 within the NTN, known per se and provided with a processor working according a protocol, to which an analogue telephone set 3 is connectable using its usual connector. The logic TA-PSTN 2 is a logic function read into the processor memory of the unit 1. The TA-PSTN 2 represents no mapping but instead a program function and can thus transmit all possible services for the telephone station.

Digital equipments 4 (only one is illustrated) are also plugged in directly to the unit 1. According to the invention the logic function TA-PSTN 2 is provided with the protocol shown in FIG. 1, or some variation of it. However, L3addr is amended to provide the wanted PSTN services.

The unit 1 is provided with a Network Termination type one 5, below called NT1, also in the form of a logic function. Both the TA-PSTN 2 and the direct connections from the digital equipments are logically coupled to the NT1 5 inside the unit 1. The protocol provided in the TA-PSTN unit is used to read when the telephone station goes off-hooked and a number is dialed and to have a dialogue with a call control 10 having a processor using a protocol in the LE, as will be explained further below. Thus the protocol relates to operations essentially between the TA-PSTN 2 and the call control 10. The unit 1 will thus function as a part of the public network, and this will make it reasonable secure against unauthorised access.

The unit 1 is connected to the LE through an interface 9 through which at least two B-channels (e.g. 64 kbit/s) for telecommunications can be provided. A bi-directional D-channel (e.g. 16 kbit/s) for ISDN and PSTN signalling and packet mode services is also provided. The connection is preferably a Digital Subscriber Line (DSL) 12, i.e. a physical cable, and could be of the standardized kind 2B+D (2B1Q/4B3T) according to the ETSI technical report ETR 080 which describes the characteristics and parameters at the Access digital section.

According to the invention it is able to make an arbitrary choice of the B-channels. This is the case, firstly since the communication between the unit 1 and the LE is done on the DSL line 12, and secondly because the protocol used in both the unit 1 and the LE has an overdimentioned address field in which instructions for arbitrary choice could be written instead of addresses. A person skilled in the art could easily for the programming when knowing the features to be amended in the protocol and therefore the exact programming is not necessary to describe.

The protocol for cooperation with the protocol in the TA-PSTN 2 in the call control 10 in the LE, in the address field L3addr, is thus provided with instructions regarding how to choose the B-channel for the transfer between the unit 1 and the LE, and to which network the signal is to be transfered, PSTN for speech signals shown in the block 7 and ISDN for data signals shown in the block 8. These blocks are commonly provided in LEs and wellknown by the man skilled in the art and therefore not described further. It is to be noted that existing ISDN-BA connection hardware is used in the LE.

By using the V5.1 interface according to clause 13 between the TA-PSTN 2 and the call control 10 when controling national PSTN protocol in the block 7, then a subscriber could be provided with the same services as if the subscriber were connected directly to the PSTN services.

The arrangement according to the invention could also be used for a "high speed" ISDN access service, such as for INTERNET/On-Line services, video telephony and other ISDN based services. For INTERNET, it enables a customer computer 4 to send IP (Information Packet) packets used by all INTERNET applications, e.g. WWW, down on all available B-channels on demand. This demand is controlled by the L3addr field in the protocol. If only a few addressable B-channels have been provided for traffic between the unit 1 and the LE, then the allocation of B-channels for an INTERNET service could be made dependent on the level of data traffic.

Also, preference procedure operations could be written into the L3addr field in the protocol. Automatic disconnection of one of two occupied B-channels could for instance be automatically provided if a telephone 3 is off-hooked. Any existing data connection with INTERNET would then continue on one B-channel. This could be made by using a Call Waiting signal via the ISDN D-channel.

The embodiment shown in FIG. 3 illustrates that the LE could be directly connected to a subscriber unit NTN 1' in the same way as in FIG. 2 but also that it could be connected to an AN 11 in a way common in the art and that the subscriber unit 1" could be connected to the AN. In the latter case the AN will be "transparent" for the signalling between the TA-PSTN 2" and the call control 10" using the same protocol as the TA-PSTN 2".

The diagrams in FIGS. 4 and 5 give the principle for the signalling according to the invention and indicate that the LE choose the B-channel available, i.e. not used by ISDN-BA, for the PSTN call.

As apparent from the diagram in FIG. 4, when a subscriber unit, telephone or computer, wants communication with another subscriber unit a message ESTABLISH regarding this is sent to the LE in the D-channel, in the protocol section L3addr=0 (indicates no B-channel selected), to establish the communication. This message always begins with a statement of which protocol to be used, such as the PSTN-protocol. Thus, the D-channel has a separate signalling for both PSTN and ISDN. The LE communicates this message to the called party and receives a signal that the establish is acknowledged.

The LE examines if there is an idle B-channel to be chosen, occupies an idle B-channel and acknowledge the establishment across the interface 9 between the unit 1 and the LE and establish the connection through the choosen B-channel.

Thus, for originating call (FIG. 4) the B-channel is not selected. Therefore, the L3addr is set to 0, i.e. not selected. When ESTABLISH is received in the LE, or before it is sent to the PSTN terminal 7, the B-channel will be selected and addressed to set L3addr=1 when B1 is selected, L3addr=2 when B2 is selected and L3addr=n when Bn is selected (n≦32767). The L3addr could also be structured in a way to allow selection of multirate B-channels.

As apparent from the diagram in FIG. 5, when the other subscriber wants to terminate the PSTN call initiated an operation lower case ESTABLISH is sent to the LE call control 10. (upper case→name on protocol message, lower case→name on primitives, message/signals between protocol and call control). The LE sends an operation ESTABLISH ACKNOWLEDGE to the NTN through the D-channel, in the protocol section L3addr=0, to terminate the communication. This message begins with a statement of which protocol to be used, such as the PSTN-protocol, and signalling for PSTN so that the operation will influence the TA-PSTN 2. The TA-PSTN in the NTN sends a signal that the establish is acknowledged. The LE sends this signal in turn to the other subscriber. Thus, the sending of a PSTN message is a primitive having the name FE-establish_request, FE-establish_acknowledge, and when a message sent to the LE the primitive FE-establish_indication and FE-establish_acknowledge_indication, respectively, is generated. This primitive is sent between the PSTN protocol function and the PSTN call control in the LE.

While the invention has been described with reference to a specific embodiment, it will be understood by those skilled in the art that various changes may be made and equivalents may be substituted for elements thereof without departing from the true spirit and scope of the invention as disclosed in the accompanying claims. In addition, modifications may be made without departing from the essential teachings of the invention as apparent from the claims.

Even if only one telephone set 3 and one computer set 4 is shown connected to the NTN 1 in FIG. 2 it is to be noted that a limited number of such sets could be provided as well within the scope of invention.

What is claimed is:

1. A method to establish both telephone and digital communication through an interface between a subscriber unit and a Local Exchange on a telecommunication line having a D-channel and several B-channels intended for digital traffic, comprising:
   amending a standard protocol of type V produced by ETSI containing steps for carrying out communications over an ISDN-line, said protocol comprising PSTN speech communication together with service functions subscribed by said subscriber;
   providing to said amended protocol features to communicate across said D-channel from said Local Exchange to said subscriber unit the B-channel, which is chosen for an actual traffic PSTN communication; and
   communicating by telephone communication between said subscriber unit and said Local Exchange by transmitting digital data packages according to said protocol through said interface between said subscriber unit and said Local Exchange.

2. The method according to claim 1, further comprising the step of allocating a B-channel for communication to a particular call arbitrary at a call set-up.

3. The method according to claim 2, further comprising the step of transforming in said protocol an address field used for addressing user ports in an Access Network to be used to allocate B-channels for communication across said telecommunication line intended for digital traffic.

4. The method according to claim 1, further comprising the step of providing priority and preference features in said amended protocol to allocate one or more of said B-channels to particular data services in dependence of a momentary level of traffic on said B-channels.

5. The method according to claim 1, further comprising the step of letting said protocol support communication between an interface connected to a telephone set in the subscriber unit and a call control in said Local Exchange.

6. An apparatus for establishing both telephone and digital communication through an interface between a subscriber unit and a Local Exchange on an ISDN-line for telecommunication intended for digital traffic and having a D-channel and several B-channels intended for digital traffic, comprising:
   a changed standard protocol of type V produced by ETSI containing the steps for carrying out communications over an ISDN-line, said changed protocol comprising features to communicate across said D-channel from said Local Exchange to said subscriber unit the B-channel, which is chosen for an actual traffic PSTN communication; and
   means for transmitting digital data packages according to said changed standard protocol comprising PSTN speech communication together with service functions subscribed by the subscriber for telephone communication between said subscriber unit and the Local Exchange through said interface between the subscriber unit and the Local Exchange.

7. The apparatus according to claim 6, further comprising priority and preference features in said amended protocol to allocate one or more of said B-channels to particular data services in dependence on a momentary level of traffic on said B-channels.

8. The apparatus according to claim 6, wherein a part of said protocol is adapted for allocating a B-channel for communication to a particular call arbitrary at a call set-up.

9. The apparatus according to claim 8, further comprising an address field in said protocol used for addressing user ports in said Access Network used to allocate B-channels for communication across the telecommunication line intended for digital traffic.

10. The apparatus according to claim 6, wherein said protocol is adapted to support communication between an interface connected to a telephone set in the subscriber unit and a call in the Local Exchange.

11. The apparatus according to claim 6, further comprising preference procedure operations for allocating available B-channels to subscriber calls written into said protocol.

12. The apparatus according to claim 6, further comprising digital IP-packets supported by said protocol to be sent down on all available B-channels on demand.

13. The apparatus according to claim 6, wherein said protocol is also adapted to disconnected an occupied B-channel for a new call if more than one B-channel is occupied by the same traffic service.

14. The apparatus according to claim 6, wherein said protocol is also adapted to disconnect an occupied B-channel for a new call if the new call has a higher priority than more than the call occupying the B-channel.

* * * * *